(12) United States Patent
Krämer

(10) Patent No.: US 7,086,305 B2
(45) Date of Patent: Aug. 8, 2006

(54) GEARSHIFT DEVICE

(75) Inventor: Klaus Krämer, Baudenbach (DE)

(73) Assignee: INA-Schaeffler KG, Herzogenaurach (DE)

( * ) Notice: Subject to any disclaimer, the term of this patent is extended or adjusted under 35 U.S.C. 154(b) by 0 days.

(21) Appl. No.: 11/175,482

(22) Filed: Jul. 6, 2005

(65) Prior Publication Data
US 2005/0241426 A1 Nov. 3, 2005

Related U.S. Application Data

(63) Continuation-in-part of application No. 10/232,463, filed on Aug. 30, 2002, now abandoned.

(60) Provisional application No. 60/317,168, filed on Sep. 5, 2001.

(30) Foreign Application Priority Data

Sep. 4, 2001 (DE) ............... 101 43 360

(51) Int. Cl.
*B60K 20/00* (2006.01)
*G05G 9/00* (2006.01)
*F16C 19/49* (2006.01)

(52) U.S. Cl. ............... 74/473.1; 74/473.25; 74/473.36; 384/50; 384/51; 384/54

(58) Field of Classification Search ............... 74/473.1, 74/473.15, 473.18, 473.19, 473.2, 473.21, 74/473.23, 473.24, 473.25, 473.26, 473.27, 74/473.36, 473.37, 492, 493; 384/48–56
See application file for complete search history.

(56) References Cited

U.S. PATENT DOCUMENTS

| | | | |
|---|---|---|---|
| 2,023,796 A * | 12/1935 | Sorensen et al. | ........... 464/165 |
| 2,520,453 A | 8/1950 | Burmist | |
| 3,003,827 A | 10/1961 | Hentschke | |
| 3,927,919 A | 12/1975 | Bunzli | |
| 3,971,599 A | 7/1976 | Shio | |
| 4,515,415 A | 5/1985 | Szenger | |
| 4,544,212 A | 10/1985 | Parzefall et al. | |
| 4,567,785 A | 2/1986 | Reynolds et al. | |
| 4,592,249 A | 6/1986 | Lehmann et al. | |
| 4,898,566 A * | 2/1990 | Hakansson | ................... 464/167 |
| 5,140,866 A | 8/1992 | Schetter et al. | |
| 5,161,926 A | 11/1992 | Schulz | |
| 5,707,153 A | 1/1998 | Steinberger et al. | |
| 5,718,515 A | 2/1998 | Furuhashi | |
| 6,027,426 A * | 2/2000 | Holman | ....................... 477/99 |
| 6,474,868 B1 * | 11/2002 | Geyer et al. | ................... 384/49 |
| 6,948,401 B1 * | 9/2005 | Zernickel et al. | ............. 74/493 |

FOREIGN PATENT DOCUMENTS

DE 41 16 823 A1 11/1992

* cited by examiner

*Primary Examiner*—Richard Ridley
*Assistant Examiner*—Colby Hansen
(74) *Attorney, Agent, or Firm*—Henry M. Feiereisen

(57) ABSTRACT

A gearshift device for a multiple-gear change box of a vehicle includes at least two gearshift rods with a rectangular cross-section. A roller bearing and a locking device are provided for guiding and locking the gearshift rods, with each gearshift rod having its own locking element.

14 Claims, 2 Drawing Sheets

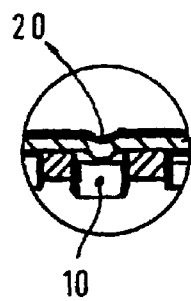
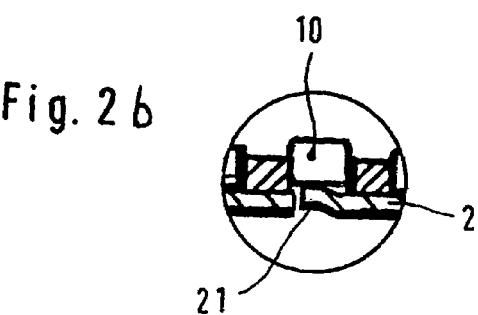
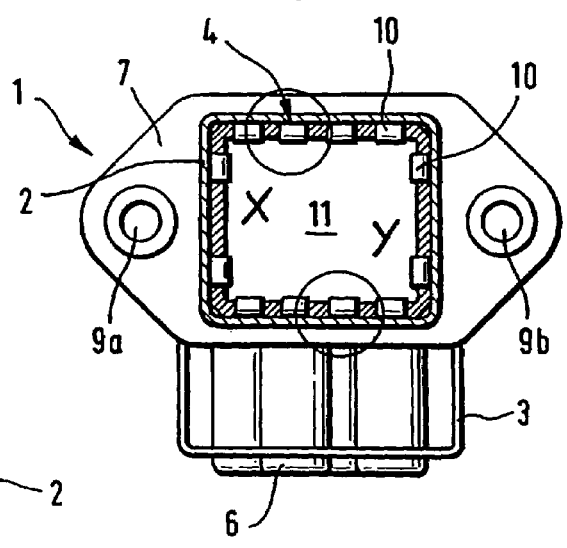
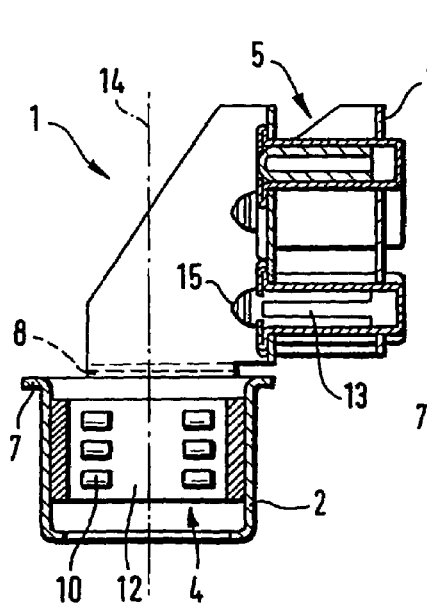
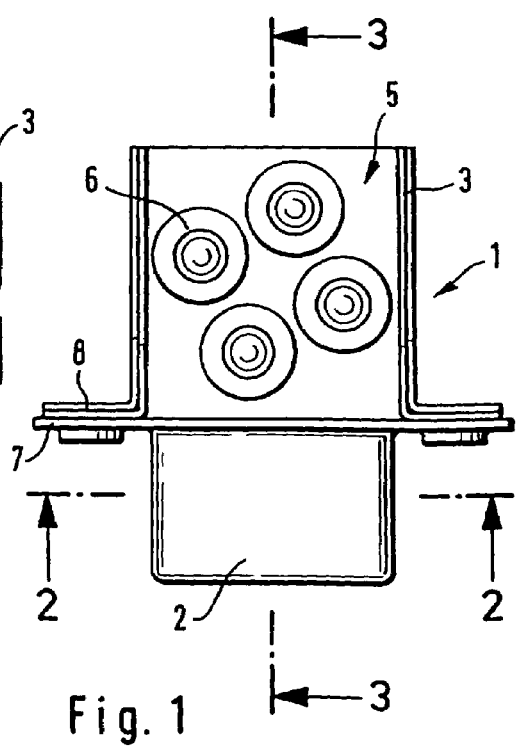

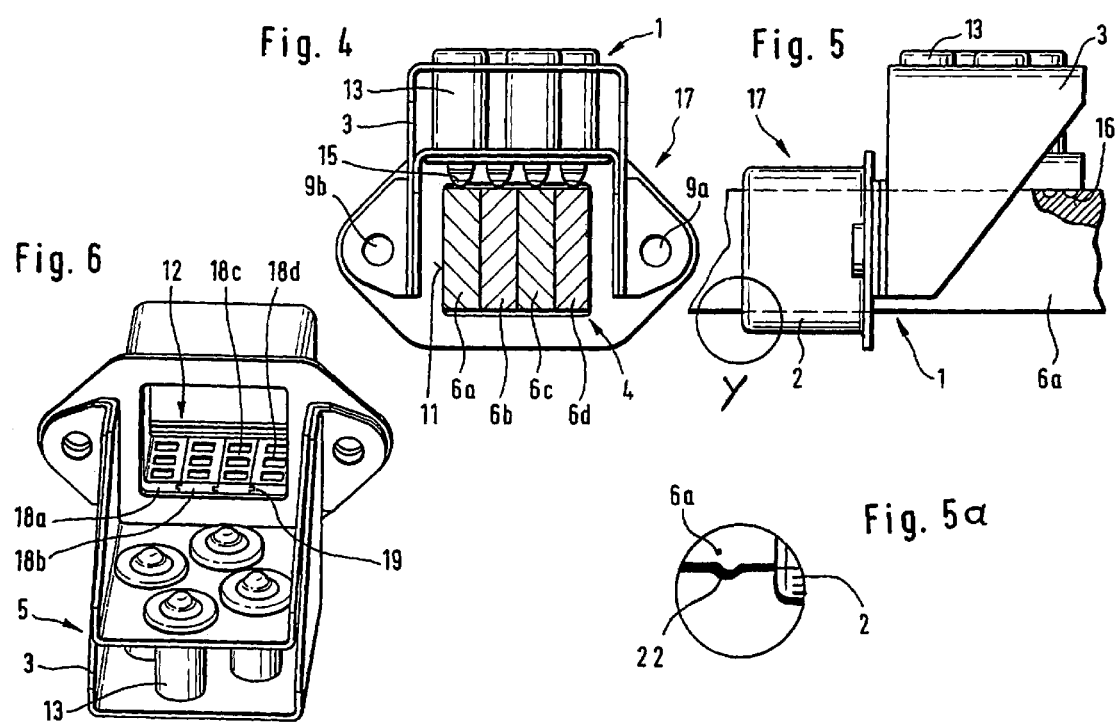

GEARSHIFT DEVICE

CROSS-REFERENCES TO RELATED APPLICATIONS

This application is a continuation-in-part of prior filed U.S. application Ser. No. 10/232,463, filed Aug. 30, 2002, now abandoned which claims the priority of German Patent Application, Serial No. 101 43 360.3, filed Sep. 4, 2001, pursuant to 35 U.S.C. 119(a)–(d), and claims the benefit of prior filed provisional application, Appl. No. 60/317,168, filed Sep. 5, 2001, pursuant to 35 U.S.C. 119(e), the subject matter of which is incorporated herein by reference.

BACKGROUND OF THE INVENTION

The present invention relates to a gearshift device for a multiple-gear change box of a vehicle, and more particularly to a gearshift device with a locked gearshift rod that is guided for movement in a linear and/or axial direction.

Different solutions for guiding and locking of gearshift and/or machine elements arranged in gear change boxes are known in the art. For example, German publication no. DE 41 16 823 C2 describes a selector shaft which is non-rotatably supported for axial displacement and has associated therewith a linear guide which has a plurality of roller ball arranged around the periphery of the selector shaft and guided on the selector shaft in axial grooves, wherein the roller balls are guided on the outside of an outer ring. The unit which is also referred to as a longitudinal ball guide is stationary, for example secured on the wall of the gear housing and enables a longitudinal guiding of the selector shaft. A separate locking device is associated with the selector shaft with an axial offset to the longitudinal ball guide. The locking device interlocks with local recesses on the selector shaft for achieving precise shift positions. The separate arrangement of the roller bearing and the locking device is not only more difficult to assemble, but also requires a larger installation space.

It would therefore be desirable to provide a compact gearshift device which can be more easily assembled and which allows several machine elements or gearshift rods to be guided and locked simultaneously.

SUMMARY OF THE INVENTION

According to one aspect of the invention, a gearshift module includes both a roller bearing and a locking device housed in at least one housing. The roller bearing includes rolling elements which are arranged parallel to a longitudinal center plane or center axis of the gearshift rods in a rectangular opening of a housing. With this arrangement, a gearshift rod or several gearshift rods arranged in parallel with a rectangular cross-sectional profile can be guided by the rolling elements. In addition, a locking device which is axially offset from the roller bearing is integrated in the gearshift module. For this purpose, the locking device has a configuration wherein a separate locking element is associated with each gearshift rod. With the invention, several selector rods arranged in a plane are centrally supported and/or guided in a gearshift module and can be locked in specified shift positions. Such gearshift module is particularly advantageous for a multiple-gear gear change box, for example a gear change box having more than five gears. The gearshift rods are guided in a very compact space and can be operated separately, requiring minimal mounting space. The shift module according to the invention can also be easily handled during assembly, since it can be pre-mounted before insertion into the gearbox.

According to an advantageous embodiment, the roller bearing of a shift module includes axially spaced-apart cylindrical rolling elements which are inserted into a cage. The cage is surrounded by a housing or integrated in the housing, to provide a longitudinal guide for the rolling elements. In accordance with the rectangular shape of the cutout, the rolling elements are arranged in two mutually offset horizontal and two mutually offset vertical parallel tracks, to form a rectangular cutout, which enable the gearshift rods to be guided with minimal friction.

The manufacturing costs of the cage can advantageously be reduced by assembling the cage from individual cage elements. Preferably, the cage elements are configured so that the wall thickness or the width of the gearshift rod is identical to the width of a cage element. The individual cage elements can be formfittingly connected with each other, for example, with a snap connection or secured with a dovetail guide. This makes possible a modular construction of cages, wherein a number of cage elements is assembled into a cage that corresponds to the number of gearshift rods. The gearshift module of the invention can be employed for gearshift rods with a rectangular cross-sectional profile, including gearshift rods with a square cross-sectional profile.

Advantageously, the gearshift rods are supported without play for improving the quality of the guide. A crowned or embossed rolling element track can be employed which can be formed directly during the manufacture of the housing without cutting. Alternatively or in addition, the gearshift rod may also be constructed with embossments in a region of the roller bearing to effect the play-free support. A housing with stamped clearance zones, in which resilient tongues engage, can also provide a play-free support, with the rolling elements supported by the resilient tongues.

The gearshift module of the invention includes the roller bearing and the locking device which are each integrated in a housing and together form an assembly. Advantageously, the housing is formed as a deep-drawn part which enables manufacture without cutting and hence reduces cost, in particular when shift modules are manufactured in large numbers.

In an alternative embodiment, the invention includes a shift module with at least one housing manufactured of plastic. Preferably, this is the housing for the locking device. The invention also includes a shift module, in which both the housing for the locking device as well as the housing for the roller bearing are made of plastic.

The housings are preferably joined by a flange connection, which is advantageously configured so as to include bores for fastening screws configured to stationarily secure the entire shift module, for example on the gear housing. Alternatively, the housings are rigidly connected in the region of the flange connection, preferably by a weld, or are formfittingly secured by a releaseable snap connection.

For forming a locking element, the locking device of the shift module according to the invention includes a spring-biased locking ball, which interlocks with a corresponding recess of the gearshift rod, for attaining precisely defined shift positions. Advantageously, the locking element is securely mounted in a two-stage housing.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 is a top view of an exemplary shift module according to the invention;

FIG. 2 is a cross-sectional view taken along the line II—II of FIG. 1;

FIG. 2a shows a detail of FIG. 2 with embossed tracks disposed on the housing;

FIG. 2b shows a detail of FIG. 2 with resilient tongues disposed on the housing;

FIG. 3 is a longitudinal cross-sectional view taken along the line III—III of FIG. 1;

FIG. 4 is a front view of another embodiment of a shift module with four inline gearshift rods;

FIG. 5 is a side view of the shift module depicted in FIG. 4;

FIG. 5a shows a detail of FIG. 5, depicting the gearshift rods with embossed portions; and FIG. 6 is a perspective view of the shift module of FIG. 1.

DETAILED DESCRIPTION OF PREFERRED EMBODIMENTS

FIG. 1 shows a top view of the two-part design of the shift module 1 according to the invention with housings 2 and 3. Disposed in the housing 2 are roller bearings 4, as shown in FIGS. 2 and 3. The housing 3 is adapted to receive a locking device 5, which includes several locking elements 6, each of which is associated with one of the gearshift rods 6a to 6d depicted in FIGS. 4 and 5. The housings 2, 3 are supported and/or secured by flanges 7, 8, with bores 9a, 9b. The gearshift module 1 can be mounted, for example, on a gear housing with bolts extending through the bores 9a, 9b.

FIG. 2 shows in more detail the construction of the roller bearing 4 in an installed position. The roller bearing 4 is inserted in a corresponding cutout of the housing 2 and thereby forms a rectangular opening 11 for the gearshift rods 6a to 6d. To allow displacement of the gearshift rods 6a to 6d with minimal friction, the roller bearing 4 has rolling elements 10 on all sides. In the horizontal planes, the cylindrical rolling elements 10 are arranged in a cage 12 in four axially spaced-apart rows. Additional cylindrical rolling elements 10 are inserted in the two mutually parallel vertical sections of the cage 10. As shown in FIG. 2a, the tracks for the rolling elements in the housing 2 can be constructed with bulbed portions or embossments 20 to support the rolling elements 10 without play. As shown in FIG. 2b, the housing 2 can also have stamped clearance zones, in which resilient tongues 21 engage, for providing a play-free support with the rolling elements 10 supported by the resilient tongues 21. Alternatively or in addition, as shown in FIG. 5a, the gearshift rods 6a to 6d may also be constructed with bulbed portions or embossments 22 in a region of the rolling elements 10 to realize a play-free guidance of the rolling elements 10.

FIG. 3 shows the gearshift module 1 in a longitudinal cross-sectional view with the rolling elements 10 inside the cage 12. The rolling elements 10 are arranged in the vertical section of the cage in two parallel rows. FIG. 3 also illustrates the design of the locking element 13 of the locking device 5. For this purpose, a radially displaceable, spring-biased locking ball 15 is provided in a tubular section extending perpendicular to a longitudinal axis 14 of the gearshift module 1. Alternatively, a pin can be provided, which is moveable in a longitudinal direction and has dome-shaped ends and formfittingly engages in a corresponding matching recess 16 when reaching a locking position, as shown in FIG. 5.

FIGS. 4 and 5 show a gearshift module 1 which in combination with the gearshift rods 6a to 6d forms a gearshift device 17. In FIG. 4, the four gearshift rods 6a to 6d are visible, which are in direct contact with each other, but can be moved and locked separately from each other. The four gearshift rods 6a to 6d fill to a large extent formfittingly the opening 11 and are hence precisely guided in the roller bearing 4. FIG. 4 also shows the locking element 13 which is associated with each gearshift rod 6a to 6d at its respective center, with the locking balls 15 of the locking elements 13 interlocking with the recess 16 when reaching the defined shift position, as shown in FIG. 5.

FIG. 6 shows the perspective view of the gearshift module 1, which shows in more detail the construction of the cage 12 with the individual cage elements 18a to 18d. The individual cage elements 18a are formfittingly connected with each other through a groove-spring connection 19 and together form the cage 12. FIG. 6 also shows a housing 3 of the locking device 5 having steps on two sides, with the individual locking elements arranged between the steps.

While the invention has been illustrated and described in connection with preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. A gearshift device for a multiple-gear change box of a vehicle, comprising:
   a housing having a longitudinal rectangular opening;
   at least two gearshift rods independently moveable from each other in an axial direction within the longitudinal rectangular opening of the housing, wherein the housing non-rotatably guides and locks the at least two gearshift rods, the housing including a roller bearing assembly having a plurality of rolling elements offset parallelly to the longitudinal axis of the housing and said rolling elements being arranged on the inner surfaces of the longitudinal rectangular opening of the housing;
   a locking device which is axially offset from the roller bearing and includes at least two locking elements, with each of the at least two locking elements associated with a corresponding one of the at least two gearshift rods; and
   means for effecting a play-free guidance of the rolling elements, comprising a cage for the plurality of rolling elements, wherein the housing has convex protrusions for directly biasing the rolling elements.

2. The gearshift device of claim 1, wherein the rolling elements have a cylindrical shape and are inserted in the cage with an axial spacing from each other with respect to the longitudinal rectangular opening, with the housing surrounding the outside of the cage.

3. The gearshift device of claim 1, wherein the cage includes a plurality of separately formed cage elements that are connected with each other and have a fixed position in the shifting module, each cage element associated with a corresponding one of the at least two gearshift rods.

4. The gearshift device of claim 1, wherein the at least two gearshift rods have a rectangular cross-section or a square cross-section.

5. The gearshift device of claim 1, wherein the housing comprises at least two housing sections, wherein one of the two housing sections receives the roller bearing and the other housing sections receives the locking device.

6. The gearshift device of claim 5, wherein at least one of the at least two housing sections is made of plastic.

7. The gearshift device of claim 5, wherein the at least two housing sections are joined by a flange connection.

8. The gearshift device of claim 5, wherein the housing section receiving the locking device comprises two stages, with the locking elements arranged between the two stages of the housing section.

9. The gearshift device of claim 1, wherein the housing is stationarily attached to a gear housing.

10. The gearshift device of claim 1, wherein the locking device includes a spring-biased locking ball adapted to interlock with a corresponding recess formed in the at least two gearshift rods, said spring-biased locking ball and corresponding recess forming the locking element.

11. The gearshift device of claim 1, wherein the convex protrusions include at least one embossed track to realize the play-free guidance of the rolling elements.

12. The gearshift device of claim 1, wherein the convex protrusions include resilient tongues to realize the play-free guidance of the rolling elements.

13. The gearshift device of claim 1, wherein the gearshift rods are received formfittingly in the rectangular opening of the housing.

14. The gearshift device of claim 1, wherein the roller bearing and the locking device are jointly integrated in the housing, thereby forming a structural unit.

* * * * *